April 11, 1961  J. R. DIECKMANN  2,979,109
METHOD AND APPARATUS FOR FORMING TIRE BEAD GROMMETS
Filed Dec. 10, 1956  4 Sheets-Sheet 1

INVENTOR
James R. Dieckmann
BY W. A. Fraser
ATTORNEY

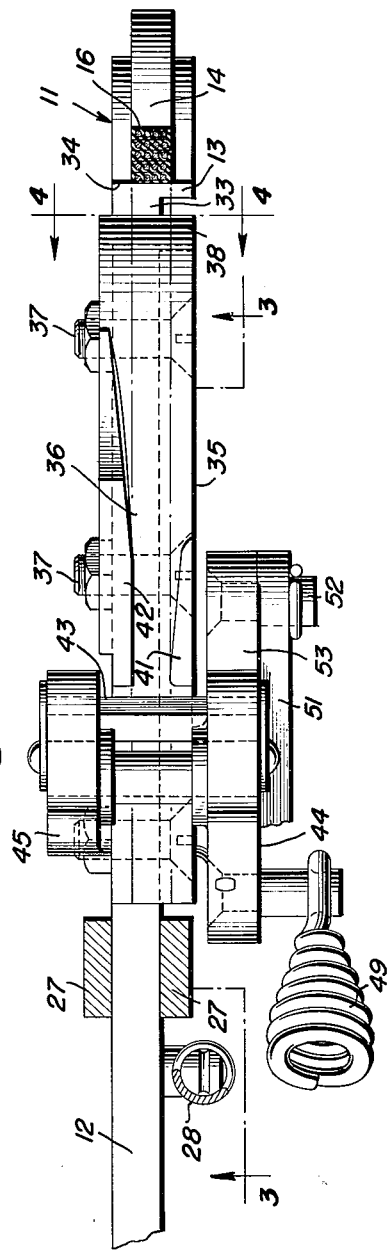
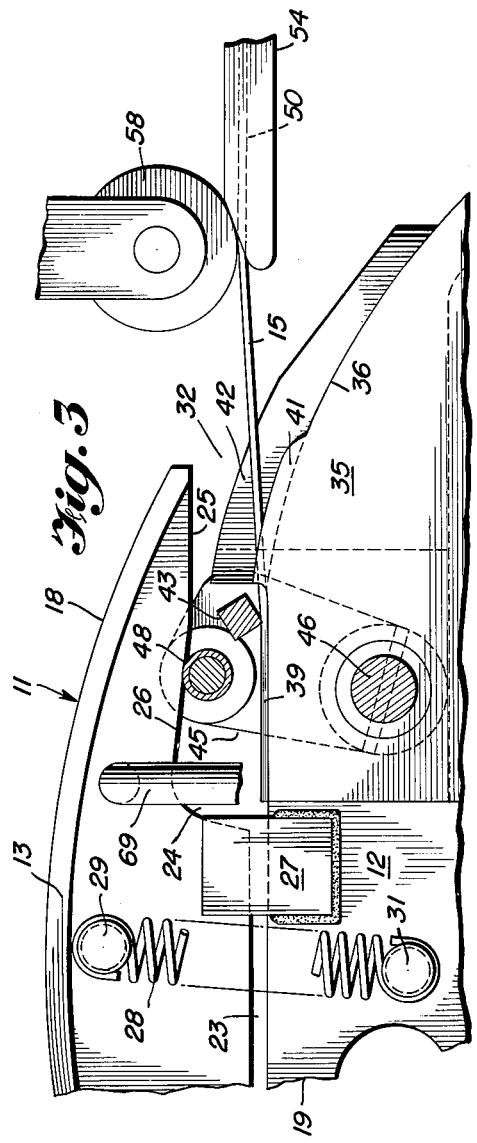

INVENTOR
James R. Dieckmann
BY W. A. Fraser
ATTORNEY

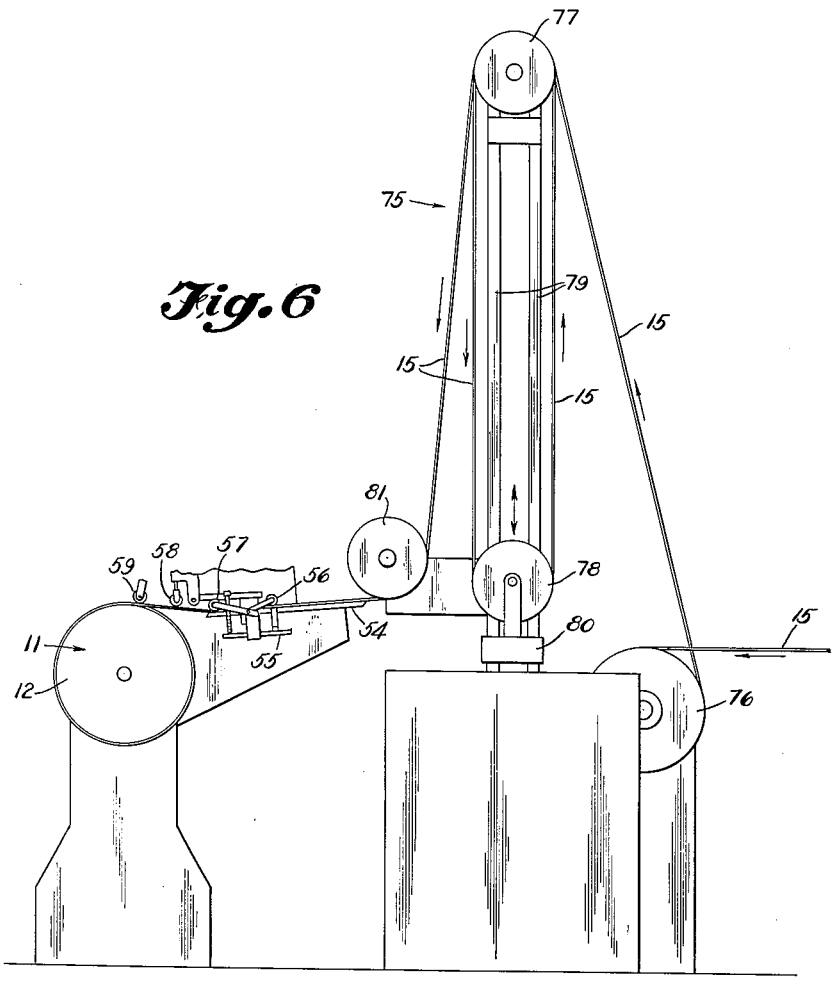

United States Patent Office 2,979,109
Patented Apr. 11, 1961

2,979,109

METHOD AND APPARATUS FOR FORMING TIRE BEAD GROMMETS

James Robert Dieckmann, Cuyahoga Falls, Ohio, assignor to The Firestone Tire & Rubber Company, Akron, Ohio, a corporation of Ohio Filed Dec. 10, 1956, Ser. No. 627,434

7 Claims. (Cl. 154—9)

This invention relates to tire bead grommets and, more particularly, to the winding of such tire bead grommets from a continuous ribbon of wire reinforced tacky, rubbery material.

Pneumatic vehicle tires are commonly provided with substantially inextensible wire grommets usually formed of high carbon steel to reinforce the bead portions of the tire. It is common practice to construct such grommets by passing a number of closely spaced parallel wires in the same plane through an extruder which places a coating of rubber around and between the wires to form a flat ribbon. This ribbon is spirally wound flat upon itself until a plurality of convolutions are built up to form a grommet having the desired thickness and tensile strength. Commonly, the inner end of the ribbon is joined to the radially inside surface of the adjacent convolution in a lap splice.

The increase in rate of acceleration and braking power of modern automobiles has resulted in a greater tendency for the tire beads to slip relative to the rim on which they are mounted. To prevent such undesirable slippage, tire manufacturers have reduced the clearance between the tire beads and the rims to zero in some cases and in others to negative clearance. This tendency toward a tighter fit of the tire beads to the rim is expected to become accelerated with the increased use of tubeless tires.

It has developed that, in tires now in common use, the bead reinforcing wires frequently become broken at or near the splice at the inner end of the ribbon when the tire bead is forced on to the rim bead seat during mounting of the tire. Such breaking is especially prevalent when the spliced portion of the bead grommet is the last portion to be seated on the rim. As set forth in the copending Robson application, Serial No. 501,153, now Patent No. 2,822,141, entitled "Tire Bead Construction," the amount of breaking is materially decreased when the splice or lap joint is located other than on the radially inner surface of the bead grommet. This co-pending application describes such a bead grommet wherein the lap joint at the inner end of the ribbon is formed on the side of the grommet.

In my co-pending application Serial No. 625,784, filed December 3, 1956, entitled "Method and Apparatus for Forming Tire Bead Grommets," there is disclosed a press for forming a lap joint on the side of a spirally wrapped bead grommet by bending the inner terminal portion of the ribbon and pressing it flatwise against the side of the grommet. After the bead grommet is wrapped from unvulcanized rubber ribbon which is in a warm tacky state, it is mounted on the side lap forming press while still warm or after reheating to maintain the tacky condition.

In prior art bead winding apparatus, the ribbon is wrapped upon a rotatable cylindrical form. Preparatory to the wrapping operation, the inner terminal portion of the ribbon is inserted through a slot in the outer periphery of the form and retained by a suitable gripping element while the form is rotated to build up the desired number of convolutions. Upon the completion of the winding operation, the natural resilience of the reinforcing wires within the ribbon causes this inner terminal portion to snap back against the adjacent ply and, because the rubber is warm and tacky, to adhere thereto. Before the bead grommet may be mounted on the side lapping press, about five to six inches of the inner terminal portion of the ribbon, which is to be attached to the side of the grommet, must be separated from the adjacent ply. This is a viscid and time-consuming operation.

To overcome these and other disadvantages of the prior art, it is a primary object of this invention to provide an improved rotatable circular form for forming an annular tire bead grommet by spirally winding a reinforced ribbon of tacky, rubbery material in a plurality of convolutions wherein means are provided to impart a permanently set inward bend to the inner terminal portion of the ribbon during the winding operation to facilitate the mounting of the wrapped grommet on a side lap forming press and the formation of a side lap splice.

It is a further object of this invention to provide an improved rotatable tire bead grommet winding form having a gripper for the inner terminal portion of the bead ribbon and a form expander in a unitary structure, operable by a single actuator member, wherein means are provided to impart a permanently set inward bend to the inner terminal portion of the bead ribbon.

It is an additional object of this invention to provide an improved method of making an annular tire bead grommet by spirally winding a reinforced ribbon of tacky, rubbery material in a plurality of convolutions and imparting a permanently set inward bend to the inner terminal portion of the ribbon during the winding operation.

One or more of the stated objects and others are achieved by the present invention which, as generally described, includes an apparatus for spirally winding a tire bead grommet from a ribbon of wire reinforced tacky, rubbery material comprising a rotatable circular winding form having a cylindrical peripheral surface to support the ribbon during the winding operation, said form having an opening extending inwardly from said peripheral surface to receive the inner terminal portion of the ribbon, one wall of said opening intersecting said peripheral surface at an acute angle to form a knife edge therebetween, gripping means positioned inwardly of said peripheral surface and circumferentially spaced a substantial distance from said knife edge to releasably retain the inner terminal portion of said ribbon, and means providing an outwardly facing surface extending inwardly from the general vicinity of said knife edge to said gripping means to support the ribbon adjacent said gripping means, the outer end of said last-named surface adjacent said knife edge being off-set radially inwardly from the peripheral surface of said form to leave the ribbon unsupported immediately adjacent said knife edge, and means to apply tension to said ribbon during the winding operation of sufficient magnitude to pull said ribbon tautly across said knife edge to impart a permanently set inward bend to the inner terminal portion of said ribbon about said knife edge.

The invention further contemplates a method of making a generally annular tire bead grommet from a tacky ribbon of heated tacky, rubbery material having metallic reinforcing means longitudinally embedded therein comprising the steps of gripping said ribbon near one end thereof, bending said ribbon along a transverse line spaced outwardly a substantial distance from said one end, spirally winding upon itself the portion of said ribbon outwardly of said line in a plurality of convolutions, internally supporting said ribbon along said line and the convolutions of said ribbon outwardly of said line in a cylindrical configuration during the winding operation while leaving said ribbon unsupported immediately inwardly of said line, pressing and bonding to each other adjacent convolutions of said ribbon during the winding operation, and applying tension to said ribbon during the winding operation of sufficient magnitude to impart a permanently set inward bend along said line to the reinforcing means in the inner convolution of said ribbon so that the terminal portion of said ribbon inwardly of said line is unadhered to and extends inwardly away from the adjacent convolution of the wrapped ribbon.

The invention having been generally set forth, a preferred specific embodiment will now be described in detail with reference to the drawings in which:

Figure 2 is a fragmentary sectional view taken in the direction of the arrows along the line 2—2 of Figure 1 showing the supporting surface and gripping means for the inner terminal portion of the bead ribbon;

Figure 3 is a fragmentary vertical sectional view taken in the direction of the arrows along the line 3—3 of Figure 2;

Figure 6 is a somewhat schematic side elevation of the apparatus of the invention showing one form of tensioning means.

Figure 1:
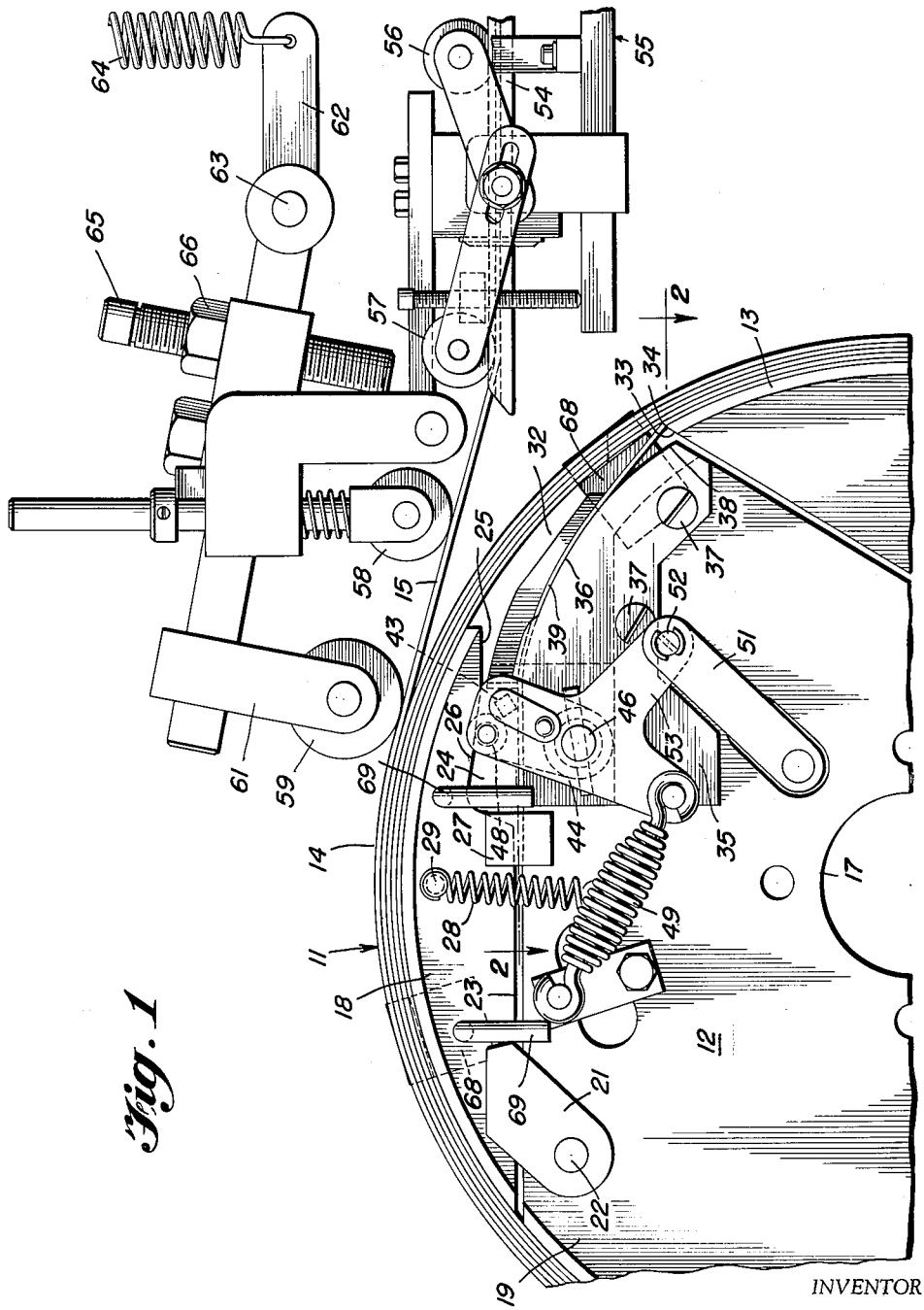
Figure 1 is a fragmentary side elevational view of the apparatus of the invention.
Figure 4:
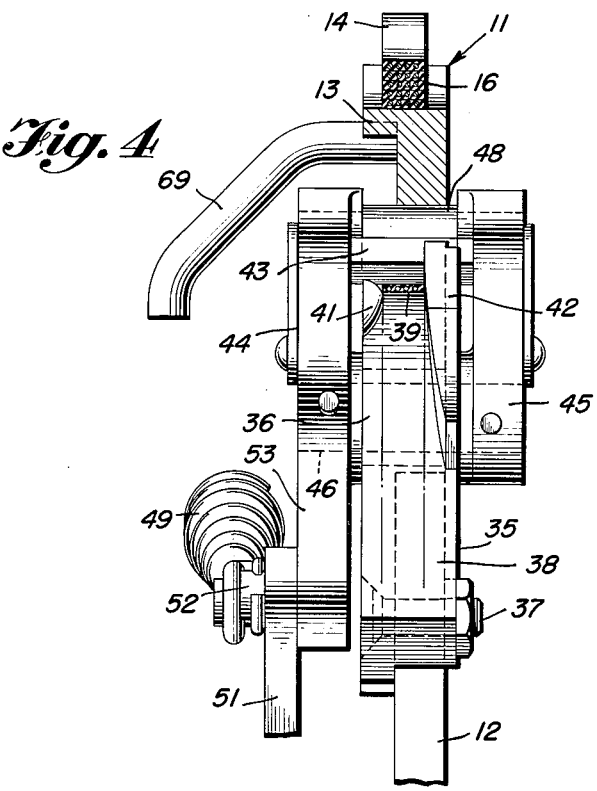
Figure 4 is a fragmentary sectional view taken in the direction of the arrows along the line 4—4 of Figure 2.

In Figure 1 there is shown a rotatable circular winding form 11 having a web portion 12 and a peripheral flange 13, the peripheral surface of which is generally cylindrical in configuration to provide support for the bead grommet 14 which is built up during the winding operation. The latter comprises a continuous flat ribbon 15 which is spirally wound upon itself in a plurality of convolutions to any desired thickness upon the form 11 as the latter is rotated. As shown in Figures 2 and 4, the ribbon 15 consists of a plurality of spaced parallel reinforcing wires 16 which lie in the ribbon in a common plane and are covered with a coating of rubber. During the winding operation, the rubber is unvulcanized and hot so as to be sufficiently tacky that adjacent convolutions adhere to one another as the ribbon is wrapped about the winding form 11.

The form 11 has a centrally located circular aperture 17 and is thereby mounted on a shaft (not shown) to which rotation is imparted by a suitable motor (not shown). The form 11 consists of two parts, one of which is a chordal segment 18 and the other of which is a main segment 19 substantially larger than the chordal segment 18. One end of the chordal segment 18 is pivotally attached to the main segment 19 by means of a pair of spaced parallel ears 21 which embrace the web 12 of the main segment 19 and are pivotally connected thereto by pin 22. The chordal segment 18 is slightly spaced from the main segment 19, thereby forming a chordal slot 23 therebetween. At the free end of the chordal segment 18, the slot 23 merges into a larger slot 24 formed by recess 25 in the chordal segment 18. The upper boundary of the slot 24 is defined by a non-radial surface 26 on the underside of the free end of chordal segment 18.

A pair of guide plates 27 are welded on opposite sides of web 12 of the main segment 19 to receive therebetween and laterally support the web of the chordal segment 18 at a point between the free end of the chordal segment 18 and the ears 21. The chordal segment 18 is normally urged toward the main segment 19 by a tension spring 28 which is connected at its outer end to studs 29 and 31 (Fig. 3) which are connected to the chordal and main segments, respectively. Thus, the chordal segment 18 may be pivoted outwardly about the pin 22 against the force of spring 28 to an expanded position during the winding operation and moved inwardly by the force of spring 28 to a collapsed position to permit easy removal of the wrapped tire bead grommet.

The main segment 19 has an opening 32 of substantial length formed in the peripheral surface thereof adjacent the free end of the chordal segment 18 to receive the inner terminal portion 39 of the ribbon 15. The wall 33 of this opening which faces the free end of the chordal segment 18 intersects the peripheral surface of main segment 19 at an acute angle to form a sharp knife edge 34 therebetween.

Figure 5:
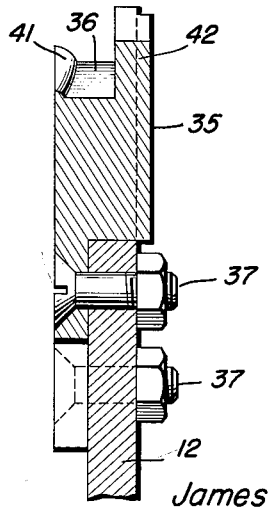
Figure 5 is a view showing the gripper insert in cross-section.

A gripper insert 35 having an outwardly facing surface 36 is connected to the web 12 by a pair of bolts 37. The surface 36 curves gradually inwardly from the general vicinity of the knife edge 34 to a point underlying the non-radial surface 26 of chordal segment 18, which point is circumferentially spaced a substantial distance from the knife edge 34. The outer end 38 of the surface 36 adjacent the knife edge 34 is radially off-set from the peripheral surface of the main segment 19 adjacent the knife edge 34. The inner terminal portion of the ribbon 15 extends over the knife edge 34 into the opening 32 where it is supported on the surface 36 between a pair of flanges 41 and 42 (Fig. 5) which extend upwardly on opposite sides of the surface 36 to provide lateral support for the ribbon 15. As the ribbon 15 is positioned on the surface 36, the flanges 41 and 42 serve to guide it into a central position and to laterally support it during the winding operation.

Beyond the inner end of the flanges 41 and 42, the inner terminal portion 39 of the ribbon is engaged near its inner end by a hardened metal gripper pin 43 mounted between a pair of gripper arms 44 and 45 which are pivotally connected on opposite sides of the gripper insert 35 by a pin 46. Also mounted between the gripper arms 44 and 45 is a roller 48. The end of the arm 45 opposite the gripper pin 43 and roller 48 is connected to the web 12 by a tension spring 49 which normally urges the arms 44 and 45 in a direction which moves the gripper pin 43 into engagement with the end of the ribbon 15 to securely retain it against the surface 36. Simultaneously, the roller 48 is moved into engagement with the non-radial surface 26 to rotate the chordal segment 18 into an operative expanded position. When the form 11 is stationary, the arm 44 is rotated in the opposite direction to disengage the pin 43 and the roller 48 from the ribbon 15 and the surface 26, respectively, by a suitable cam means (not shown) which is connected to the inner end of a radial link 51 which in turn is pivotally connected by pin 52 to an ear 53 extending outwardly from arm 44. By this action, the form is collapsed to facilitate removal of the wrapped grommet and the inner terminal portion of the ribbon is released from the gripper pin 43.

During the winding operation, the end of the ribbon 15 is firmly retained between the gripper pin 43 and the surface 36 of the gripper insert 35. As the ribbon 15 is fed to the form 11, it is maintained under tension of sufficient magnitude that the ribbon is pulled tightly along the surface 36 across the knife edge 34 and is wrapped around the peripheral surface of the form 11. The portion of the ribbon adjacent the gripper pin 43 is supported by the surface 36 but because of the radial offset between the outer end 38 of the surface 36 and the peripheral surface of the form 11, the portion of the ribbon immediately inward of the knife edge 34 is unsupported. Because of the non-support of the ribbon inwardly of the knife edge 34, the ribbon 15 is sharply engaged by the knife edge 34 and is flexed thereabout due to the vibration set up during the winding operation and especially due to force exerted by the knife edge during the period of initial rotation of the form 11. Because of this action, a permanently set inward bend is imparted by the knife edge to the inner terminal portion 39 of the ribbon 15. This facilitates the mounting of the wrapped grommet on a side lap forming press and enables the inner terminal portion of the ribbon to be bent around to the side of the grommet for the formation of a side lap splice. The spacing between the gripper pin 43 and the knife edge 34 and the length of the surface 36 should be such that the permanently set bend is located a substantial distance from the inner end of the ribbon. This distance should be sufficient to enable an adequate side lap to be formed and is preferably from about five to six inches.

It has been found that, due to the natural resilience of the metal wires 16 reinforcing the ribbon 15, a permanently set inward bend will not normally be imparted to the ribbon if the end 38 of the surface 36 intersects the peripheral surface of the form 11 and thus provides support for the ribbon immediately inwardly of the knife edge 34. Therefore, the radial off-set between the surface 36 and the peripheral surface of the form 11 adjacent the knife edge is of critical importance. Further, it has been found that an acute angle between the wall 33 and the peripheral surface of the form 11 is esssential to provide a knife edge which is sufficiently sharp to impart a permanently set inward bend to the resilient reinforcing wires 16 in the ribbon 15.

The gripper insert 35 is preferably a separate element bolted to the web 12 of the form 11 as shown in order that it might be mounted on a conventional rotatable bead winding machine of the general type described herein. Such a conventional machine may easily be modified by cutting away the web to receive the gripper insert 35 and by forming the knife edge 34 at the periphery of the machine. Alternatively, the gripper insert may be fabricated as an integral part of the web of the main segment 19 of the form 11.

During the winding operation, ribbon 15 is supplied to the form 11 from a conventional tensioning device of the dead-weight type, indicated generally at 75 in Figure 6. Ribbon 15 passes first over an idler pulley 76, alternately over multi-grooved pulleys 77 and 78 to form a series of festoons, over idler pulley 81, along an upwardly facing groove 50 (Figure 3) of a reciprocable horizontal guide 54, and finally onto form 11. Pulley 78, which is adapted to move vertically along ways 79 (note arrow), carries a weight 80 tensioning ribbon 15 against the action of form 11.

The guide 54 is mounted upon frame 55 which consists of a plurality of supporting and bracing members which are shown only to the extent necessary for a complete understanding of the invention. Mounted on the frame 55 are a pair of guide rollers 56 and 57 and a feed roller 58 which are conventional and form no part of the present invention. The feed roller 58 is spring-biased downwardly as shown. Accordingly, the supporting structure for these rollers will not be described in detail. The guide 54 is extended to a position close to the peripheray of the form 11 during the initial mounting of the ribbon 15 on the form 11 and is moved to a retracted position during the winding operation.

Inward pressure is applied by presser roller 59 to the bead grommet 14 as the various convolutions of ribbon 15 are built up on the form 11 to cause adherence of adjacent convolutions to each other. The presser roller 59 is mounted on the end of a finger 61 which in turn is connected to the end of presser roller mounting arm 62. The arm 62 is pivotable about pin 63 which is connected to a suitable supporting structure (not shown). The end of the arm 62 opposite the presser roller 59 is connected to the supporting structure (not shown) by tension spring 64 which normally rotates the arm 62 about pin 63 to move the presser roller 59 inwardly against the bead grommet 14. Mounted between the finger 61 and the pivot pin 63 is an adjustable stop screw 65 which limits the inward movement of the presser roller 59 by engagement with the top surface of frame 55. The stop screw 65 is preferably adjusted by nut 66 to a position such that the inward movement of the presser roller 59 is limited to the peripheral surface of the form 11 so that presser roller 59 is restrained against entry into the opening 32 during rotation of form 11.

A plurality of ejector fingers 68 are mounted by suitable means (not shown) to the form 11 so as to be movable inwardly over the peripheral surface of the form to remove the wrapped bead grommet after the winding operation has been completed. To insure that the various elements connected to the side of the form 11 do not interfere with the removal of the wrapped grommet, a pair of guide fingers 69 (Fig. 4) are connected as by welding to the chordal segment 18, which fingers extend axially outwardly beyond the outermost projection on the side of form 11 and are bent downwardly to permit the completed grommet to slide freely thereover.

In the operation of the apparatus, while the form 11 is stationary, the link 51 is moved radially outwardly by cam means (not shown) to rotate the gripper arms 44 and 45 in a counterclockwise direction as shown in Figure 1 to separate the roller 48 from the non-radial surface 26 and to separate the gripper pin 43 from the surface 36. Thus, by the action of spring 28, the chordal segment 18 is collapsed inwardly against the main segment 19. The inner terminal portion 39 of the ribbon 15 may then be inserted between the gripper pin 43 and the surface 36 whereupon the cam means (not shown) holding the link 51 is released and the arms 44 and 45 are rotated in a clockwise direction as shown in Figure 1 by spring 49. This action moves the roller 48 outwardly against the non-radial surface 26 to expand the chordal segment 18 into operative position and moves the gripper pin 43 into engagement with the end of the ribbon 15 which is thereby retained between the pin 43 and surface 36. When the winding operation is begun by imparting rotation to form 11, the force effecting the rotation and overcoming the inertia of weight 80, pulls ribbon 15 taut against surface 36 (Figure 1) and knife edge 34, to permanently bend the inner terminal portion 39 of the ribbon 15 around knife edge 34 into the desired position. As form 11 continues to rotate, the tension exerted by weight 80 causes adjacent convolutions of the ribbon to tightly engage one another as they are wound on the form. Continuous inward pressure is applied to the grommet by the presser roller 59 as the various convolutions are built up.

Because of (1) the radial off-set between the outer end 38 of the surface 36 and the peripheral surface of the form 11 and (2) the knife edge 34 formed by the acute angle between the wall 33 and the peripheral surface of the form 11, a permanently set inward bend is imparted to the inner terminal portion 39 of the ribbon 15 which is pulled taut across the sharp corner 34 during the winding operation.

When the desired number of convolutions of ribbon has been built up, the rotation of the form 11 is disconnected. The outer end of the ribbon is then severed and falls against the radially outer surface of the grommet and adheres thereto. The link 51 is again moved outwardly by the cam means (not shown) to disengage the gripper pin 43 from the end of the ribbon and to move the roller 48 away from the non-radial surface 26. This permits the chordal segment 18 to be collapsed against the main segment by the force of spring 28 to loosen the grip of the form 11 against the inner surface of the finished grommet 14. The ejector fingers are then moved inwardly over the peripheral surface of the form 11 to remove the finished grommet. Since a permanently set inward bend has been imparted to the inner terminal portion of the ribbon, such portion remains in a position extended away from and unadhered to the surface of the adjacent convolution. Thus, the wrapped grommet may easily be mounted in a press for the formation of the lapped splice on the side of the tire bead grommet.

There has been illustrated and described what is considered to be a preferred embodiment of the invention. It will be understood that various modifications may be made without departing from the scope of the appended claims.

What is claimed is:

1. In an apparatus for forming an annular tire bead grommet by spirally winding in a plurality of convolutions a ribbon of tacky, rubbery material having reinforcing wire longitudinally embedded therein with a permanently set inward bend imparted to the inner terminal portion of the ribbon at a location spaced a substantial distance from the end thereof, the combination of a rotatable circular winding form having a cylindrical peripheral surface to support the ribbon during the winding operation, said form having an opening extending inwardly from said peripheral surface to receive the inner terminal portion of the ribbon, one wall of said opening intersecting said peripheral surface at an acute angle to form a knife edge therebetween, gripping means positioned inwardly of said peripheral surface and circumferentially spaced a substantial distance from said knife edge to releasably retain the inner terminal portion of said ribbon, means providing an outwardly facing surface extending inwardly from the general vicinity of said knife edge to said gripping means to support the ribbon adjacent said gripping means, the outer end of said last-named surface adjacent said knife edge being off-set radially inwardly from the peripheral surface of said form to leave the ribbon unsupported immediately inward of said knife edge, and means to apply tension to said ribbon during the winding operation of sufficient magnitude to pull said ribbon tautly across said knife edge to impart a permanently set inward bend to the inner terminal portion of said ribbon about said knife edge.

2. The combination as recited in claim 1 further characterized by a pair of spaced flanges extending upwardly from said second-named surface to guide into position and laterally support the inner terminal portion of said ribbon therebetween.

3. In an apparatus for forming an annular tire bead grommet by spirally winding in a plurality of convolutions a ribbon of tacky, rubbery material having reinforcing wire longitudinally embedded therein with a permanently set inward bend imparted to the inner terminal portion of the ribbon at a location spaced a substantial distance from the end thereof, the combination of a rotable circular winding form having a cylindrical peripheral surface to support the ribbon during the winding operation, said form having an opening extending inwardly from said peripheral surface to receive the inner terminal portion of the ribbon, one wall of said opening intersecting said peripheral surface at an acute angle to form a knife edge therebetween, gripping means positioned inwardly of said peripheral surface and circumferentially spaced a substantial distance from said knife edge to releasably retain the inner terminal portion of said ribbon, means providing an outwardly facing surface extending inwardly from the general vicinity of said knife edge to said gripping means to support the ribbon adjacent said gripping means, the outer end of said last-named surface adjacent said knife edge being off-set radially inwardly from the peripheral surface of said form to leave the ribbon unsupported immediately inwardly of said knife edge, a presser roller to engage the radially outside surface of the outermost convolution of raid ribbon during the winding operation, yielding means urging said presser roller inwardly against said outermost convolution, stop means to limit the extent of inward movement of said presser roller to the peripheral surface of said winding form to restrain said roller against entry into said opening during the winding operation, and means to apply tension to said ribbon during the winding operation of sufficient magnitude to pull said ribbon tautly across said knife edge to impart a permanently set inward bend to the inner terminal portion of said ribbon about said knife edge.

4. The combination as recited in claim 3 further characterized by a pair of spaced flanges extending upwardly from said second-named surface to guide into position and laterally support the inner terminal portion of said ribbon therebetween.

5. In an apparatus for forming an annular tire bead grommet by spirally winding in a plurality of convolutions a ribbon of tacky, rubbery material having reinforcing wire longitudinally embedded therein with a permanently set inward bend imparted to the inner terminal portion of the ribbon at a location spaced a substantial distance from the end thereof, the combination of a rotatable circular winding form having a cylindrical peripheral surface to support the ribbon during the winding operation, said form having a fixed main segment and a chordal segment pivotally connected to said main segment at one of its ends and normally spaced from said main segment when the form is expanded to full operative circumference, yielding means urging the free end of said chordal segment toward said main segment, said main segment having an opening extending inwardly from the peripheral surface thereof to receive the inner terminal portion of the ribbon, one wall of said opening intersecting said peripheral surface at an acute angle to form a knife edge therebetween, said main segment having a second surface facing outwardly in said opening and extending inwardly from the general vicinity of said knife edge to a location circumferentially spaced a substantial distance from said knife edge and underlying the free end of said chordal segment, the outer end of said last-named surface being off-set radially inwardly from the peripheral surface of said form to leave the ribbon unsupported immediately inwardly of said knife edge, an arm pivotally mounted on said main segment, means on said arm to move the free end of said chordal segment outwardly from said main segment, means on said arm to releasably retain against said second surface the inner terminal portion of said ribbon, yielding means normally urging said arm in a direction to disengage said last two means from said chordal segment and the inner terminal portion of said ribbon respectively, said arm being movable outwardly against the force of said last-named yielding means to effect expansion of said form to operative circumference and gripping of the inner terminal portion of said ribbon, and means to apply tension to said ribbon during the winding operation of sufficient magnitude to pull said ribbon tautly across said knife edge to impart a permanently set inward bend to the inner terminal portion of said ribbon about said knife edge.

6. The combination as recited in claim 5 further characterized by a presser roller to engage the radially outside surface of the outermost convolution of said ribbon during the winding operation, yielding means urging said presser roller inwardly against said outermost convolution, and stop means to limit the extent of inward movement of said presser roller to the peripheral surface of said winding form to restrain said roller against entry into said opening during the winding operation.

7. A method of making a generally annular tire bead grommet from a ribbon of tacky, rubbery material having inextensible reinforcing means embedded longitudinally therein, comprising the steps of positively gripping and supporting said ribbon near one end thereof, bridging said ribbon from the supported area to an edge spaced radially outwardly from said area, imparting a said edge, spirally winding upon itself the portion of said substantially axially extending bead to said ribbon along ribbon outwardly of said edge in a plurality of convolutions, pressing and bonding to each other adjacent convolutions of said ribbon during the winding operation, and applying tension to said ribbon during the winding operation sufficient to impart to the inner convolution of said ribbon a permanent inward bend at said edge whereby the terminal portion of said ribbon inwardly of said edge extends radially inwardly away from the adjacent convolution after said winding operation.

References Cited in the file of this patent

UNITED STATES PATENTS

| | | |
|---|---|---|
| 571,156 | Forsberg | Nov. 10, 1896 |
| 1,406,215 | O'Brien et al. | Feb. 14, 1922 |
| 1,655,853 | Leguillon | Apr. 10, 1928 |
| 1,738,018 | Pfeiffer et al. | Dec. 3, 1929 |
| 2,115,450 | Shook | Apr. 26, 1938 |
| 2,151,306 | Shook | Mar. 21, 1939 |
| 2,265,246 | Ott | Dec. 9, 1941 |
| 2,382,672 | Shook | Aug. 14, 1945 |
| 2,387,380 | Zahutnik | Oct. 23, 1945 |
| 2,559,824 | Leland | July 10, 1951 |
| 2,576,568 | Burge et al. | Nov. 27, 1951 |
| 2,822,141 | Robson | Feb. 4, 1958 |

UNITED STATES PATENT OFFICE
CERTIFICATE OF CORRECTION

Patent No. 2,979,109                    April 11, 1961

James Robert Dieckmann

It is hereby certified that error appears in the above numbered patent requiring correction and that the said Letters Patent should read as corrected below.

Column 9, lines 7 and 8, strike out "said edge, spirally winding upon itself the portion of said substantially axially extending bead to said ribbon along" and insert instead -- substantially axially extending bend to said ribbon along said edge, spirally winding upon itself the portion of said --.

Signed and sealed this 13th day of March 1962.

(SEAL)
Attest:

ERNEST W. SWIDER
Attesting Officer

DAVID L. LADD
Commissioner of Patents